No. 667,841.  Patented Feb. 12, 1901.
E. C. HERBERT.
ATTACHMENT FOR HORSE HAY RAKES.
(Application filed Aug. 27, 1900.)
(No Model.)

Witnesses

E. C. Herbert, Inventor.

By C. A. Snow & Co.
Attorneys

UNITED STATES PATENT OFFICE.

EDWARD C. HERBERT, OF MANSON, IOWA.

ATTACHMENT FOR HORSE HAY-RAKES.

SPECIFICATION forming part of Letters Patent No. 667,841, dated February 12, 1901.

Application filed August 27, 1900. Serial No. 28,201. (No model.)

*To all whom it may concern:*

Be it known that I, EDWARD C. HERBERT, a citizen of the United States, residing at Manson, in the county of Calhoun and State of Iowa, have invented a new and useful Attachment for Horse Hay-Rakes, of which the following is a specification.

My invention is an improved attachment for horse hay-rakes especially designed for supporting the rake-teeth in an elevated position after they are discharged of a bunch of hay without fatigue to the operator and for releasing the rake-head and dropping the rake-teeth after the latter have cleared the windrow.

My invention consists in the peculiar construction and combination of devices hereinafter fully set forth, and pointed out in the claims.

Figure 1:
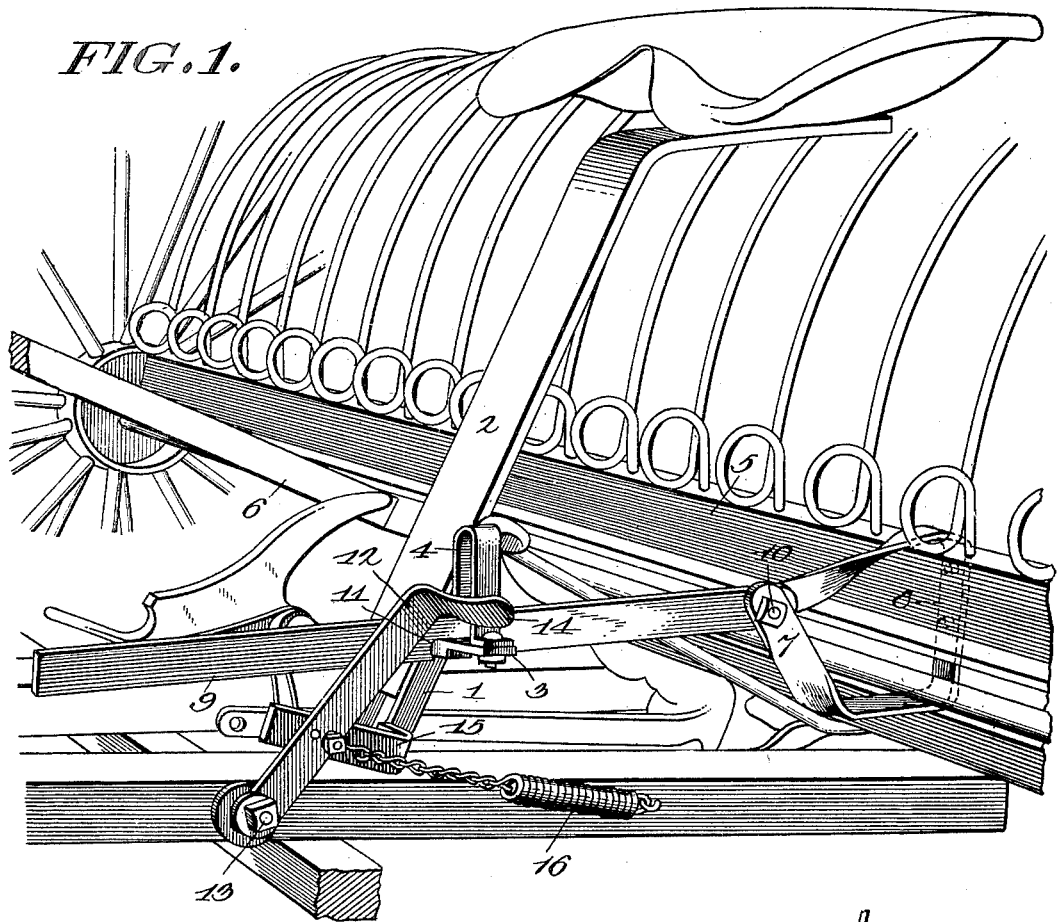
Figure 2:
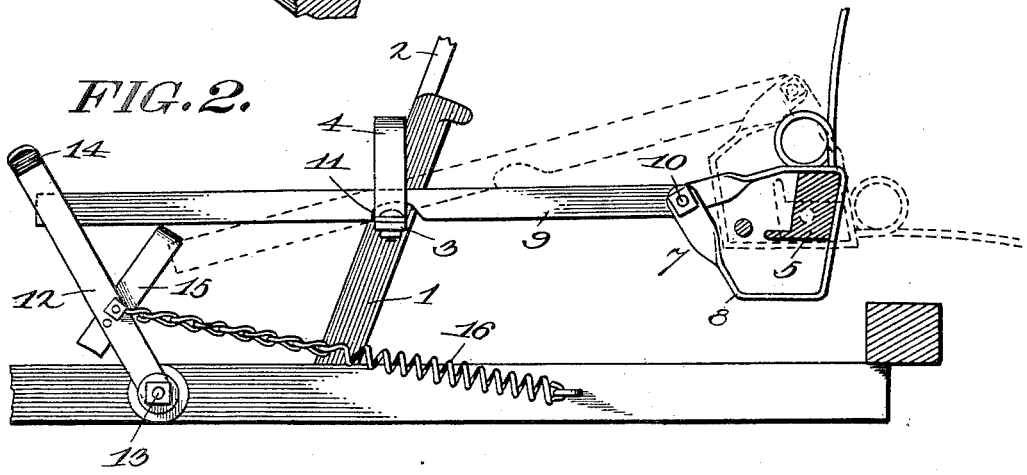

In the accompanying drawings, Figure 1 is a perspective view of a portion of a horse hay-rake of the make known as the "Osborne" rake provided with an attachment embodying my invention, showing the same in position to support the rake-teeth when elevated. Fig. 2 is a side elevation of the same, partly in section.

In the embodiment of my invention I provide the support 1 for the seat-bar 2 with a stop 3, which, as here shown, is an arm that projects laterally from the outer side of the support 1. An inverted-U-shaped guide or keeper 4 is bolted on the arm or stop 3.

The rake-head 5, which is provided with the usual hand-lever 6, whereby it may be turned so as to raise the rake-teeth to discharge the same of a bunch of hay with which they are loaded, is provided with a link 7, which comprises the two sections 8 9. The section 8 is bolted to the rake-head, as shown, and adapted to turn therewith, and the section or member 9 is longitudinally movable and is pivotally connected to the section 8, as at 10. The said section 9 is adapted to be engaged and locked by the stop 3 when the rake-head is turned by the lever 6 to the position shown in the drawings, with the rake-teeth elevated. In the embodiment of my invention here shown the section or member 9 has a notch 11 on its lower side, which notch when said member 9 is moved forward when the rake-head is turned to elevate the rake-teeth engages the stop 3, the member 9 being a gravitating member, and thereby the rake-head becomes automatically locked when its teeth are thus elevated. The member 9 is guided and retained in position on the arm or stop 3 by the guide-keeper 4. It will be understood that the rake-head being thus automatically locked when the teeth are turned to an elevated position to discharge the bunch of hay therefrom onto a windrow the operator is relieved of the fatigue of supporting the rake-teeth in this elevated position while the windrow is being cleared.

I will now describe a trip-lever which I have invented and which coöperates with the locking-link to disengage the latter from the stop-arm, and thereby release the rake-head and permit the rake-teeth to drop after the windrow has been cleared.

The lever 12 is fulcrumed at its lower end on one side of the frame of the rake, as at 13, and is provided at its upper end with a pedal 14, the said lever being adapted to be operated by one foot of the driver. Said lever is provided on its inner side with an arm 15, which as the lever is moved forward engages the lower side of link member 9 and raises the latter, so as to disengage the notch 11 thereof from the stop-arm 3, whereupon the rake-head is unlocked and may be turned rearward to drop the rake-teeth to the ground. A spring 16, which normally moves the foot-lever 12 rearward, is connected to said foot-lever and to a fixed point on the frame of the rake, as shown.

In Fig. 2 of the drawings the positions assumed by the members of the locking-link when the same is disengaged from the stop-arm are indicated in dotted lines, and the position assumed by the foot-lever when the latter is moved forward to engage the arm 15 thereof with the lower side of link member 9 just prior to lifting the latter, so as to disengage the notch 11 from stop-arm 3, is indicated in full lines.

Having thus described my invention, I claim—

1. In a horse hay-rake, the combination with a rake-head and a lever to turn the same and raise the rake-teeth, of a fixed stop, an endwise-movable link connected to the rake-head and adapted to engage said stop and thereby lock the rake-head in position when the rake-teeth are elevated, a foot-lever having a trip-arm to engage said pivoted member of said link and disengage the same from the stop, to release the rake-head, and a spring connected to said foot-lever to return the same to its initial position, substantially as described.

2. In a horse hay-rake, the combination with a rake-head and a lever to turn the same and thereby raise the rake-teeth, of a seat-bar support having a stop, a link connected to said rake-head and adapted to engage the said stop and thereby lock the rake-head when the rake-teeth are raised, said seat-bar support being further provided with a guide for said pivoted member, and a trip-lever to disengage said member from said stop, substantially as described.

In testimony that I claim the foregoing as my own I have hereto affixed my signature in the presence of two witnesses.

EDWARD C. HERBERT.

Witnesses:
CHAS. E. BALE,
J. P. BALLSTADT.